United States Patent

[11] 3,573,826

[72] Inventors Duane G. Fredericks
Lockport;
Lewis Michnik, Buffalo, N.Y.
[21] Appl. No. 815,067
[22] Filed Apr. 10, 1969
[45] Patented Apr. 6, 1971
[73] Assignee Sierra Research Corp.

[54] BEACON CALIBRATED AFC RADAR
6 Claims, 1 Drawing Fig.

[52] U.S. Cl. ........................................... 343/17.7
[51] Int. Cl. ........................................... G01s 7/40
[50] Field of Search ................................ 343/17.7

[56] References Cited
UNITED STATES PATENTS
3,263,228  7/1966  Abrahams et al. .............  343/17.7
3,343,168  9/1967  Fayram ..........................  343/17.7
3,354,457  11/1967  Pfab et al. .....................  343/17.7

*Primary Examiner*—Rodney D. Bennett, Jr.
*Assistant Examiner*—T. H. Tubbesing
*Attorney*—Alexander and Dowell

ABSTRACT: In combination with a radar unit having automatic frequency control means for tuning its receiver accurately to its transmitter, means for calibrating the radar unit with respect to range by using a frequency shift reflector located a known distance from the radar unit and serving to provide echos at a different frequency than normal skin reflections, the radar unit being provided with a range gate to selectively pass substantially only the shifted reflections through the receiver and with switching means to transfer the automatic frequency control circuit to be responsive to the frequency of the shifted reflections rather than to the radar's transmitted frequency.

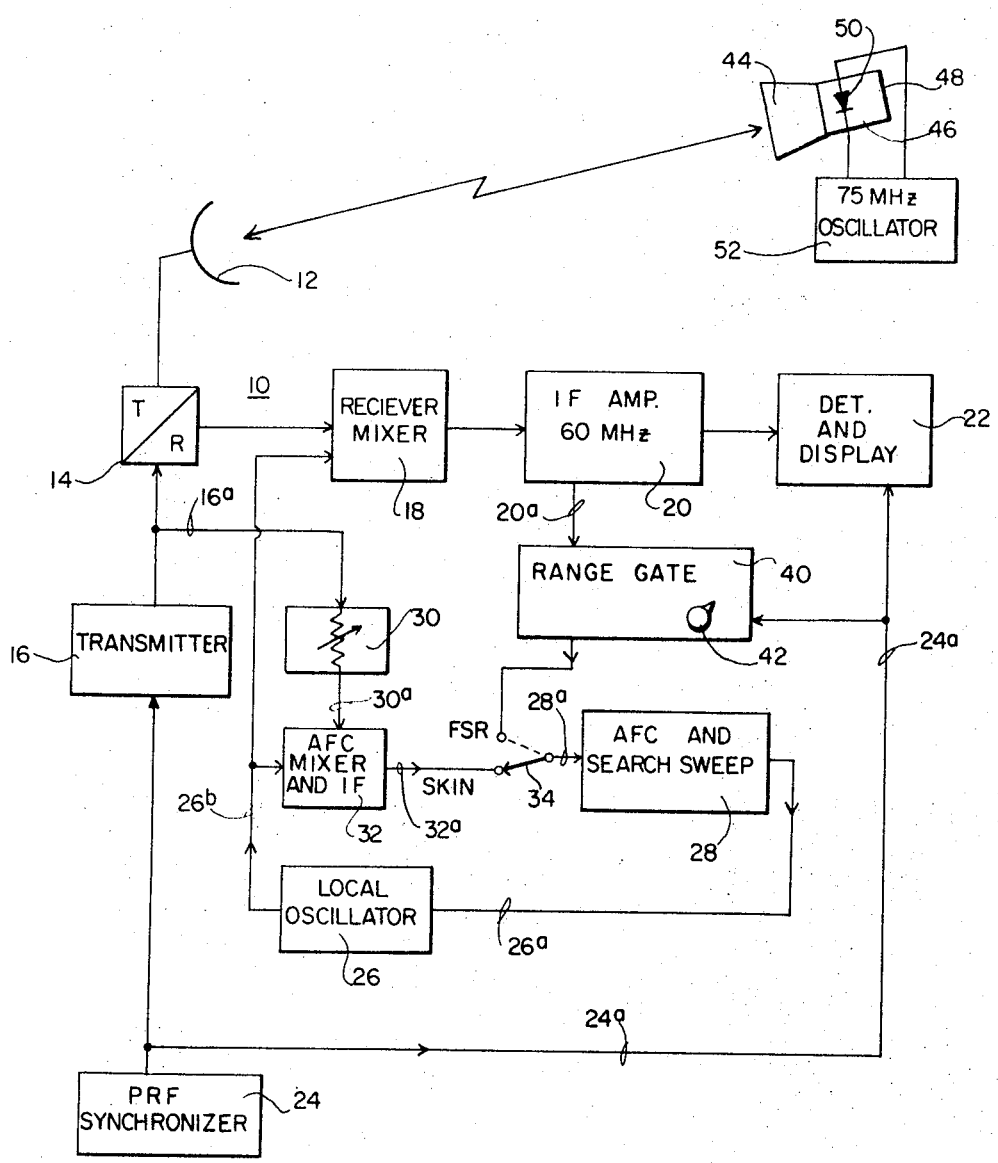

BEACON CALIBRATED AFC RADAR

DISCLOSURE

This invention relates to calibration means for radar units, and more particularly to the combination of an improved AFC radar unit with a remotely located frequency-shift reflector with which the automatic frequency control (AFC) in the radar can be made cooperative so that during calibration the system can be made substantially nonresponsive to skin reflections returning at the frequency initially transmitted by the radar unit.

Especially in the case of fixed-position radar units of which a high degree of accuracy is expected, such as tracking radars or missile launching site radars, it is important to have a reliable way of checking the range calibration and sensitivity of the radar so that the operator is assured of efficient operation. Ordinary skin reflections from known objects in the environs are often used for this purpose but such reflections are rather unreliable because there is no way to be sure that a target located, for example, at a range of 5 miles has not changed or been augmented by the presence of a vehicle which is not usually there. Moreover, natural targets vary as to reflectivity from time to time with changes in surface dampness, foliage conditions, etc., and hence cannot be relied upon for the purpose of checking radar sensitivity.

It is a principal object of this invention to provide a unique and reliable beacon target located at a known range and peculiarly cooperative with a radar unit of the type having AFC means normally maintaining the radar receiver precisely tuned to its transmitter frequency.

A further principal object of the invention is to provide in combination with the AFC radar unit a frequency-shifting beacon, reflector, or other frequency shifting and signal returning means, which responds to illumination at the radar frequency by returning an echo whose frequency is shifted from the transmitted frequency of the radar by an amount placing it outside of the normal passband of the radar receiver, so that when the receiver is retuned to the beacon reflection frequency it will suppress received echos arriving at the transmitted frequency of the radar. A suitable type of reflector is shown in Chisholm U.S. Pat. No. 3,108,275.

Another principal object of the invention is to provide improvements in such an AFC radar unit by which, during calibration mode of operation, the AFC means in the radar unit can be switched over to track the receiver tuning to make it responsive to the shifted frequency of the beacon reflector, and not to ordinary skin reflections.

Another major object of the invention is to provide means for making it easier for the AFC to retune the receiver to the beacon response frequency when the calibration mode is selected by the operator. In the operating embodiments of the present invention, the AFC has a sweep for search function which becomes operative when the AFC loses the input signal to which it has been tuning the receiver. It sweeps through a wide frequency range from one end toward the other and locks onto the first signal of suitable magnitude which it comes upon. Thus, when the operator disconnects it from the transmitted frequency it begins searching for another. It is now connected to acquire frequencies from the receiver, and it searches these frequencies always commencing from the same extreme end of the spectrum to which it is sensitive. This fact can be exploited by displacing the beacon frequency shift toward the end of the spectrum from which the AFC search always progresses so that the AFC will happen upon the shifted beacon frequency echo before it happens upon an echo occurring at the radar transmitted frequency, and will therefore cease searching and tune the receiver to the beacon frequency. This likelihood is also greatly enhanced according to the present invention by providing an adjustable range gate for disabling the output of the receiver except during reception of signals at the range of the beacon reflector, thereby eliminating from the AFC all of the very large amplitude skin reflections occurring especially at close range. This function can be still further improved by placement of the beacon reflector at a location devoid of other major skin reflection targets, whereby the opening of the aforesaid range gate at the range of the beacon reflector will pass to the AFC a signal whose frequency is predominantly composed of the beacon's shifted frequency and not of the originally transmitted frequency.

Yet another important object of the invention is to provide point targets cooperating with an AFC radar system of the type employing two different transmission frequencies, for instance in X-band and in Ku-band, so that the radar can be aligned and calibrated at both frequencies using uniquely identifiable point targets at the same remote location, or perhaps using a single target operative at both of said frequencies.

A further object of the invention is to provide a simple and inexpensive calibration system which can easily be incorporated into AFC radar systems. An example of an AFC radar to which the present improvement can be added is shown in Risely U.S. Pat. No. 3,412,335.

Other objects and advantages will become apparent during the following discussion of the drawing, which is a block diagram showing an illustrative embodiment of the present invention.

Referring now to the drawing, the illustrative embodiment comprises a radar unit 10 including a transmitting and receiving antenna 12 coupled by a T/R box 14 to a transmitter 16 and a receiver mixer 18, the mixer feeding an IF amplifier 20 whose output drives a detector and display 22 of any suitable character. A synchronizer 24 modulates the transmitter 16 and keys the receiver and display functions in a manner well-known per se in the radar art. The receiver means also includes a local oscillator 26 whose frequency can be adjusted by any one of a number of arrangements, represented schematically by the wire 26 The local oscillator frequency is controlled by output from an automatic frequency control unit 28 having an input lead 28a which can be connected to suitable means for providing a sample frequency for the AFC unit 28 to lock onto. As in conventional radar systems having automatic frequency control of the receiver, a sample of the transmitted pulse is taken from the wire 16a and passes through an attenuator 30 and via wire 30a to a crystal mixer 32 to which local oscillator frequency is also applied via the wire 26b. The inputs on wire 30a and 26b to the crystal mixer 32 provide an output on the wire 32a at the intermediate frequency resulting from mixing the local oscillator and the transmitted pulse. In the present case the IF frequency is assumed to be 60 MHz. The crystal mixer box 32 is advantageously provided with sufficient amplification at 60 MHz. to select an IF output on the wire 32a. This output passes through the switch 34 which is shown in its normal position and the AFC unit 28 determines how close to 60 MHz. the output on wire 32 is. It then issues a frequency-control signal on the wire 26a to the local oscillator 26, and this control signal adjusts the local oscillator to provide accurate 60 MHz. IF on the wire 32a. In this way, conventionally, the radar maintains its receiver precisely tuned to the frequency of the pulse being transmitted by its transmitter 16 and assures that the output from the mixer 18 into the IF amplifier 20 will occur at 60 MHz. for each reflection returning at the same frequency as the transmitter 16 delivered to the antenna 12. Thus far, the present discussion has been directed toward a conventional AFC radar of the type shown in U.S. Pat. Nos. 2,425,013; 2,537,597; 2,798,946; or 2,881,321. It really does not matter whether the radar is pulse operated, or is a CW type, since AFC can be performed in the manner described in connection with either type of radar.

The novel improvements according to the present invention include the addition of the switch 34, and the addition of a range gate system 40 in the case of a pulse radar type of system. The range gate includes a control knob 42 by which the gate can be moved back and forth along the sweep of the display unit 22 in order to deliver to the AFC system only such echos as occur at the range of the reflector 44.

The present improvements also include the frequency-shifting beacon reflector comprising a waveguide horn 44 which is flared at its outer end and is coupled to a short section of waveguide 46 which is closed at the opposite end 48 and is of such a length as to be reflective at the frequency at which the system is intended to operate. It is not necessarily a requirement that the end 48 of the waveguide be closed, but only that it be terminated so as to provide a normally reflective condition for radar signals entering the horn 44. A short-circuiting means 50, comprising a diode in the present illustrative embodiment, is connected across the waveguide in a position such that, when the short-circuiting device 50 is conductive, the waveguide section 46 will no longer be reflective to as great an extent. By proper proportioning of the parts 46, 48 an 50 the short-circuiting device 50 can be made to modulate the reflectivity of the device so as to effectively mix the incoming radar frequency with an oscillation provided by the oscillator 52 and thereby provide reflections which are shifted from the frequency of the radar transmitter 16 by an amount determined by the frequency of the oscillator 52. In this case, it is assumed that the modulating frequency of the oscillator 52 is 75 MHz., and that as a result of this modulation the signals reflected from the reflector will comprise two sidebands each displaced from the transmitter frequency by 75 MHz.

It is the purpose of the present invention to use the AFC unit 28 to move the local oscillator frequency on wire 26b to a new frequency at which the radar will be sensitive only to one of the reflected sidebands from the horn 44 because the other frequencies will be outside of the passband of the IF amplifier 20. The range gate 40 supplies a signal from the IF amplifier to the upper terminal of the switch 34, and thence to the AFC unit 28 when the switch is in its upper position. However in a preferred embodiment, not all output from the IF amplifier 20 is supplied to the AFC unit, but only output which occurs at a moment in time corresponding with the range at which the frequency-shift reflector horn 44 is located. As indicated above, this range is adjustable by rotation of the knob 42 which controls the moment at which the range gate 40 is opened to pass the signal on wire 20a to the upper terminal of switch 34. The range itself may be taken from the trailing edge of a Schmitt trigger output, the leading edge of which is pulsed on by output from the synchronizer on wire 24a to correspond with the moment of transmission of the radar's main-bang pulse. This is a common type of range gating and will suffice in the present instance to pass only the shifted-frequency echo from the horn 44 to the AFC unit 28, which shifted signal then becomes the main input to the AFC unit. The AFC may also receive a certain amount of skin echo response, and perhaps some magetron splash, but these spurious signals should be at a reduced amplitude as compared with the frequency-shifted signals from the horn 44.

The signal taken from the IF amplifier 20 on the wire 20a is taken from an earlier stage in the amplifier so that subsequent tuned stages of the IF amplifier will not discriminate against the frequency-shifted response which will in the initial instance be 75 MHz. removed from the 60 IF frequency to which the amplifier 20 is tuned. It may also be necessary to amplify a signal from the amplifier on wire 20a using the several stages of amplification found in the AFC unit 28, which is a purchased item.

At any rate the AFC, being now supplied only with beacon-shifted input via the switch 34, will lock onto this frequency and readjust the local oscillator 26 so as to apply such a frequency to the mixer 18 that a 60 MHz. IF signal will appear at the outputs of the IF amplifier 20 whenever a beacon-frequency signal is received at the antenna 14.

In this way, the radar receiver is retuned to be sensitive only to the frequency-shifted reflections from the horn 44, and not to ordinary skin reflections. It will stay tuned to the beacon reflections so long as the switch 34 remains in the upper position. Conversely, if the operator returns the switch 34 to the lower position, the input to the AFC will then comprise only a mixed component of the transmitter frequency which will provide a frequency different than 60 MHz. on the wire 32a. In every case, the AFC unit always seeks to return the signal supplied to its input 28a to 60 MHz. by readjusting the frequency of the local oscillator 26. Therefore, the AFC unit 28 will lock onto the only frequency now being supplied to it, and change the local oscillator until that frequency becomes 60 MHz. The radar system is now retuned to receive skin reflections, and will resume its normal operation.

In summary, the present invention provides means by which uniquely identifiable signals can be received and displayed from a frequency-shift beacon located at a known range with respect to the radar unit, and in which an AFC unit is used either to tune the receiver to the transmitted radar frequency or else to tune the receiver to the beacon-shifted frequency, preferably also using a range gate to eliminate other signals which might possibly cause confusion of the AFC unit. The indicator unit 22 always displays the output of the main IF amplifier 20, and a technician can easily determine by looking at the display whether or not the AFC unit has in fact tuned the receiver to the shifted beacon-response frequency, the display showing only beacon-return echos if the receiver has been tuned to it but showing normal skin echos if it has not. In the event that the AFC has somehow locked onto a skin echo instead of a frequency-shifted signal appearing on the wire 20a, the technician need only flip the switch 34 back and forth once in order to dump whatever signal the AFC unit has locked onto and start it making a new search to find the shifted frequency coming from the horn 44.

It is assumed of course that the antenna 12 is pointing toward the horn 44 when the switch 34 is moved to the upper position, since there will be no shifted-frequency reflection to tune to otherwise. Obviously many variations of the present system are possible so long as the various embodiments use a frequency-shifted return from a remote source such as a reflector or beacon and use an automatic frequency control system in the radar for selectively changing the tuning of the radar receiver from the magnetron frequency to the shifted return frequency.

We claim:

1. In combination with a radar unit including transmitter, receiver and indicator means, and including automatic frequency control (AFC) means having an input normally connected to sample the transmitted frequency, and the AFC means being operative to maintain the receiver means accurately tuned to the sampled frequency, means for use in calibrating the radar unit, including:
   a. means located at a known distance from the radar unit and operative to shift its transmitted frequency, and to return a shifted-frequency signal to its receiver means; and
   b. switch means in the radar unit for switching the input of the AFC means from the transmitter means to the receiver means to sample the returning shifted-frequency signal, whereby the AFC means will retune the receiver means thereto.

2. In a combination as set forth in claim 1, range gate means in the radar unit connected between said switch means and the receiver means and including means for adjusting the gate means to conduct from the receiver means to the switch means only those signals corresponding in time to signals returning from a distance corresponding with the known range of the frequency shifting means with respect to the radar unit.

3. In a system as set forth in claim 1, wherein the AFC means operates in the intermediate frequency range of the receiver means and is normally coupled to the output of the transmitter means through an AFC mixer and is connected to tune a local oscillator which is coupled both to a mixer in the receiver means and to the AFC mixer, said switch means being connected to selectively couple the AFC input to sample the output of either of said mixers.

4. In a system as set forth in claim 3, the frequency shift of the shift means being greater than one-half of the band pass of the receiver intermediate frequency amplifier, and the switch means being coupled to a point early in said amplifier subsequent to the mixer.

5. In a system as set forth in claim 1, wherein the AFC means is of the type which sweeps across its frequency range always in the same direction in search of a signal to lock onto, such sweeping occurring automatically when the AFC means loses the signal it was previously locked onto, the shift means including a modulating oscillator having its frequency selected to provide a shifted sideband signal displaced from the transmitted frequency on the side which the AFC means first sweeps across.

6. In a system as set forth in claim 1, said receiver means having an amplifier operating at an intermediate frequency, and said shift means having means for shifting the frequency of reflections by an amount greater than half the bandwidth of the intermediate amplifier, and said indicator means being coupled to display echos passing through the intermediate amplifier, whereby when the AFC means tunes the receiver means to the shifted-frequency signals, the display will include substantially only the latter signals.